United States Patent [19]
Frech et al.

[11] Patent Number: 5,729,592
[45] Date of Patent: Mar. 17, 1998

[54] CALLING PARTY IDENTIFICATION ANNOUNCEMENT SERVICE

[75] Inventors: Dewey Alcott Frech, Aurora; John Brian Reid, Naperville, both of Ill.; Anton Johannes Roug, Glen Allen, Va.; Timothy Jerome Scale, Downers Grove, Ill.

[73] Assignee: Lucent Technologies Inc., Murray Hill, N.J.

[21] Appl. No.: 686,001

[22] Filed: Jul. 25, 1996

[51] Int. Cl.⁶ .................. H04M 1/57; H04M 1/66
[52] U.S. Cl. ............ 379/67; 379/127; 379/142; 379/197
[58] Field of Search ............... 379/67, 88, 142, 379/127, 196, 197, 245, 246, 201

[56] References Cited

U.S. PATENT DOCUMENTS

| | | | |
|---|---|---|---|
| 4,899,358 | 2/1990 | Blakley | 379/67 |
| 5,007,076 | 4/1991 | Blakley | 379/67 |
| 5,309,512 | 5/1994 | Blackmon et al. | 379/210 |
| 5,511,111 | 4/1996 | Serbetcioglu et al. | 379/67 |
| 5,651,053 | 7/1997 | Mitchell | 379/67 |

*Primary Examiner*—Thomas W. Brown

[57] ABSTRACT

Calling party identification announcement service (CPIAS) provides an announcement of the caller's name to a called party, so that the called party may accept of reject a call. This invention relates to arrangements for providing CPIAS using centralized announcement synthesis apparatus, under the control of a data base (in accordance with the principles of intelligent networks), within the basic call processing arrangements of the public switched telephone network, without requiring users of the services to have two telephone numbers. Billing entries for the use of the announcement service are made under the control of the terminating switch so that these entries can be readily combined with other billing entries for the called party in order to generate a bill for that party.

6 Claims, 5 Drawing Sheets

5,729,592

CALLING PARTY IDENTIFICATION ANNOUNCEMENT SERVICE

TECHNICAL FIELD

This invention relates to arrangements for providing an announcement of the name or telephone number of a caller to a called customer.

Problem

Calling number and calling name identification is a popular service. The called party sees a display of the calling number or, more recently, the listed name of the calling party. This permits the called party to accept or reject the call.

A disadvantage of regular calling number/name identification is that it requires special equipment to display the number or name at any receiving telephone station. This disadvantage is overcome in accordance with the teachings of U.S. Pat. No. 4,899,358 (the '358 patent) which discloses arrangements for announcing a name or number for an incoming call, and U.S. Pat. No. 5,007,076 (the '076 patent) which discloses arrangements for announcing a name or number for a waiting call to a party who has call waiting service. The announcement is receivable on any telephone instrument without requiring the special display equipment.

The disadvantage of the arrangements disclosed in the '358 and '076 patents is that there is disclosed no fully satisfactory arrangement for receiving the announcement from a source outside the terminating switch for incoming calls. Since the speech synthesis apparatus is expensive, especially on a per announcement circuit if the group of synthesized announcement circuits is small, it is highly desirable to centralize the synthesized announcement equipment at a service node to serve a plurality of terminating switches.

A further problem is that if the synthesized announcement circuits are remote from the terminating switch, the called party should be billed for the use of the public switched network for accessing the synthesized announcement circuits and for the use of the accessing network connection during the call. This presents an unusual billing problem since both the calling and called parties are billed for different parts of the call. If all billing were performed in the usual way, by preparing announcement billing records at the service node, i.e., the point of origination of the added connection, a severe coordination problem is encountered because the service node billing records must be combined with the usual subscriber billing records at the terminating switch.

Another problem associated with the use of a service node to supply the synthesized announcement is that if the service is provided in a straightforward way, an additional directory number must be assigned to each subscriber for the announcement service. This special directory number is used for making the connection from the service node to the called party; otherwise, the terminating switch, on receiving a call from the service node, would attempt to re-forward this call to the service node. While the '076 patent, which only treats call waiting calls gets around this requirement because call waiting can be provisioned to have a higher precedence than call forwarding, this solution does not work for incoming calls. The use of large numbers of additional telephone numbers is highly undesirable.

Solution

The above problems are solved and an advance is made over the teaching of the prior art in accordance with applicants' invention for providing calling party identification announcement service (CPIAS), wherein upon receipt of a call to a party having announcement service, the call is forwarded, in response to instructions obtained from a data base, using a single special number or route index for forwarding calls from the terminating switch, to a centralized service circuit node/intelligent peripheral (SCN/IP) at some point for providing a synthesized announcement; the SCN/IP at some point queries a data base with the received calling directory number (typically obtained by automatic number identification ANI) in order to determine the text version of the calling customer's name; this text version is returned to the SCN/IP and will be used for synthesizing subsequent announcement to the called party; the SCN/IP, in response to instructions from a data base, originates an outgoing call via the terminating switch to the called party, a call which is recognized by the data base in a subsequent query from the terminating switch as originating from the SCN/IP and therefore not to forwarded but to be terminated to the called party; when the called station goes off hook, the SCN/IP plays a synthesized announcement of the caller's name, and waits for a signal indicating acceptance or rejection of the call; when the called station signals to the SCN/IP that the called party wishes to answer the call, the SCN/IP sends an indication to the terminating switch that the called station is to be connected directly to the calling station and the connection to the SCN/IP is to be dropped; billing for use of the SCN/IP and connections thereto is performed at the terminating office. Advantageously this arrangement allows the calling announcement service to be offered to parties without using any extra telephone numbers. Advantageously, this arrangement allows the billing for the basic call to be handled for the calling party at the originating switch, and allows the called party to be billed at the terminating switch which charges the called party for the use of the SCN/IP and the transmission facilities for accessing the SCN/IP as well as for the data base query to determine the calling party's textual name. Advantageously, this arrangement allows the service to be provided flexibly, using a data base, in accordance with the principles of intelligent network operation. In accordance with one feature of applicants' invention, a query to a data base (a service control point, SCP) is used to distinguish between the incoming call (which is to be forwarded to the service node) and the call from the service node to the terminating switch (which is to be terminated to the called party); the data base (SCP) recognizes the origination number used by the service node to distinguish incoming calls from service node originated calls. Advantageously, this arrangement avoids the need for two telephone numbers for the customers who have CPIAS.

In accordance with one feature of applicants' invention, the connection between the terminating switch and the SCN/IP is an Integrated Services Digital Network (ISDN) connection wherein the two legs that are connected to the service node are on different call appearances of one B-channel. This simplifies the process of dropping the connection to the service node and bridging the incoming call connection to the terminating party; this process is accomplished by sending a transfer request command to the terminating switch requesting that the two call appearances be merged and that the B-channel be disconnected.

DETAILED DESCRIPTION

Figure 1:
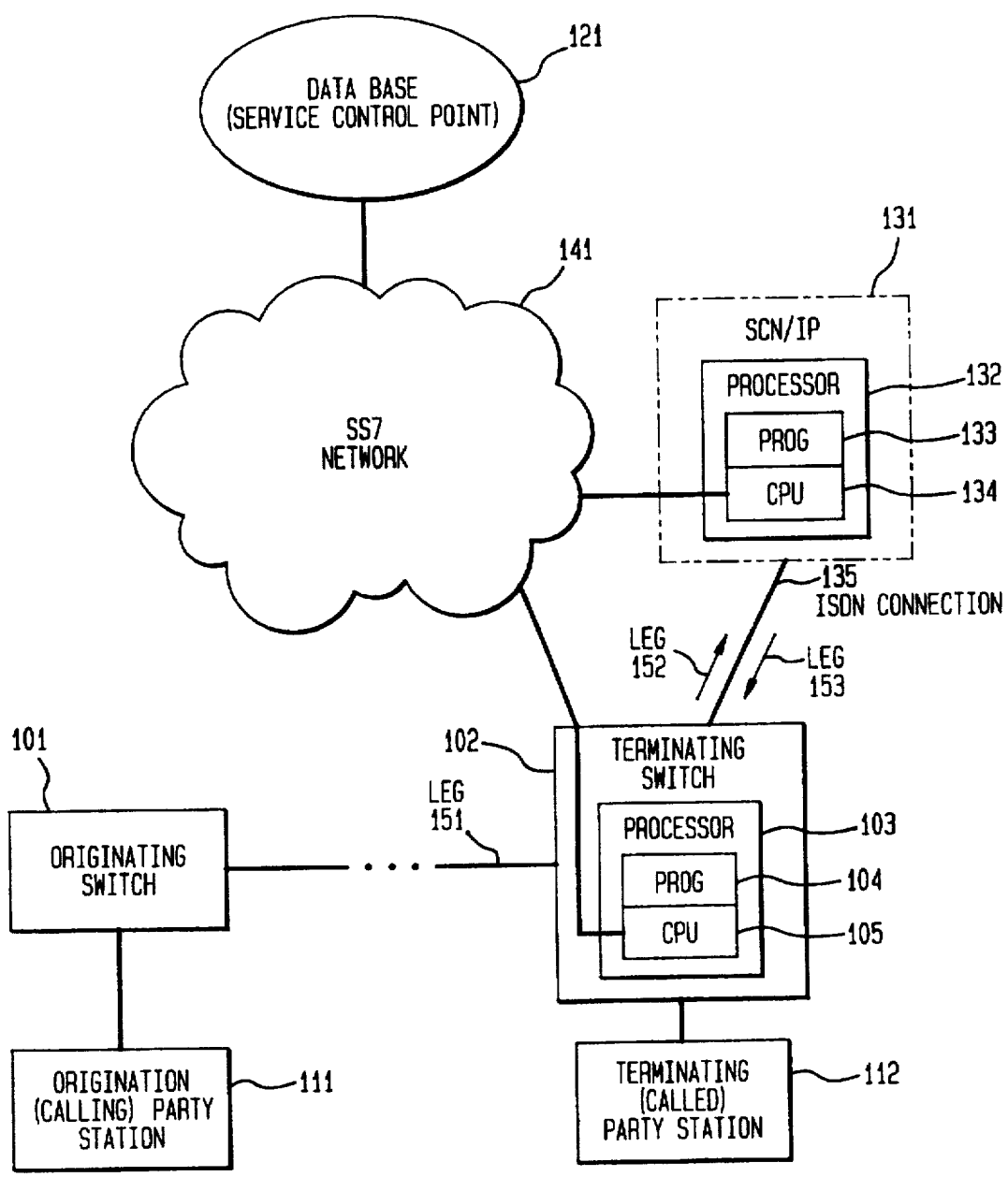
FIG. 1 is an overall block diagram illustrating a call with CPIAS.
Figure 2:
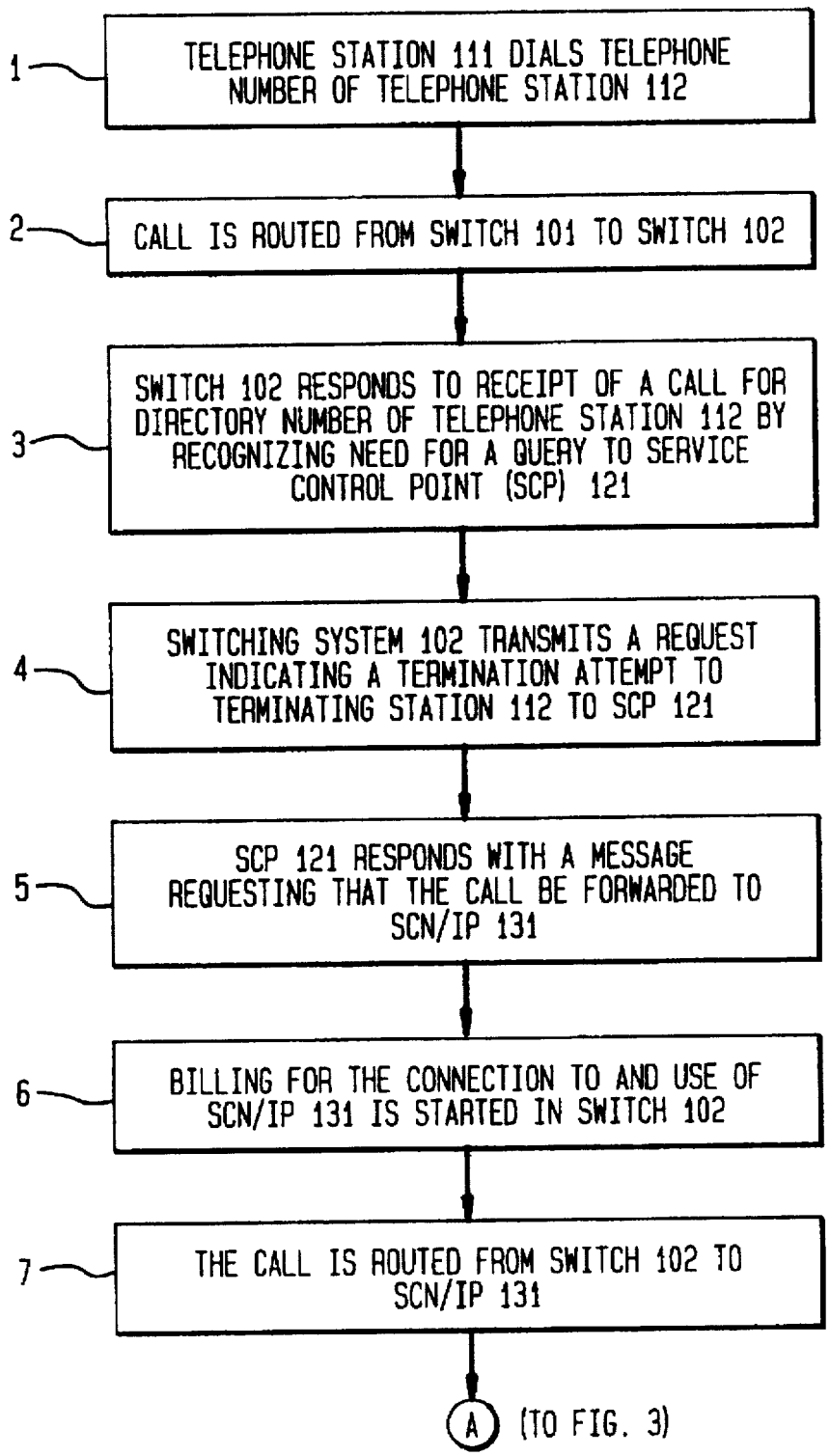
FIG. 2-5 are flow charts illustrating a method of providing CPIAS.
Figure 3:
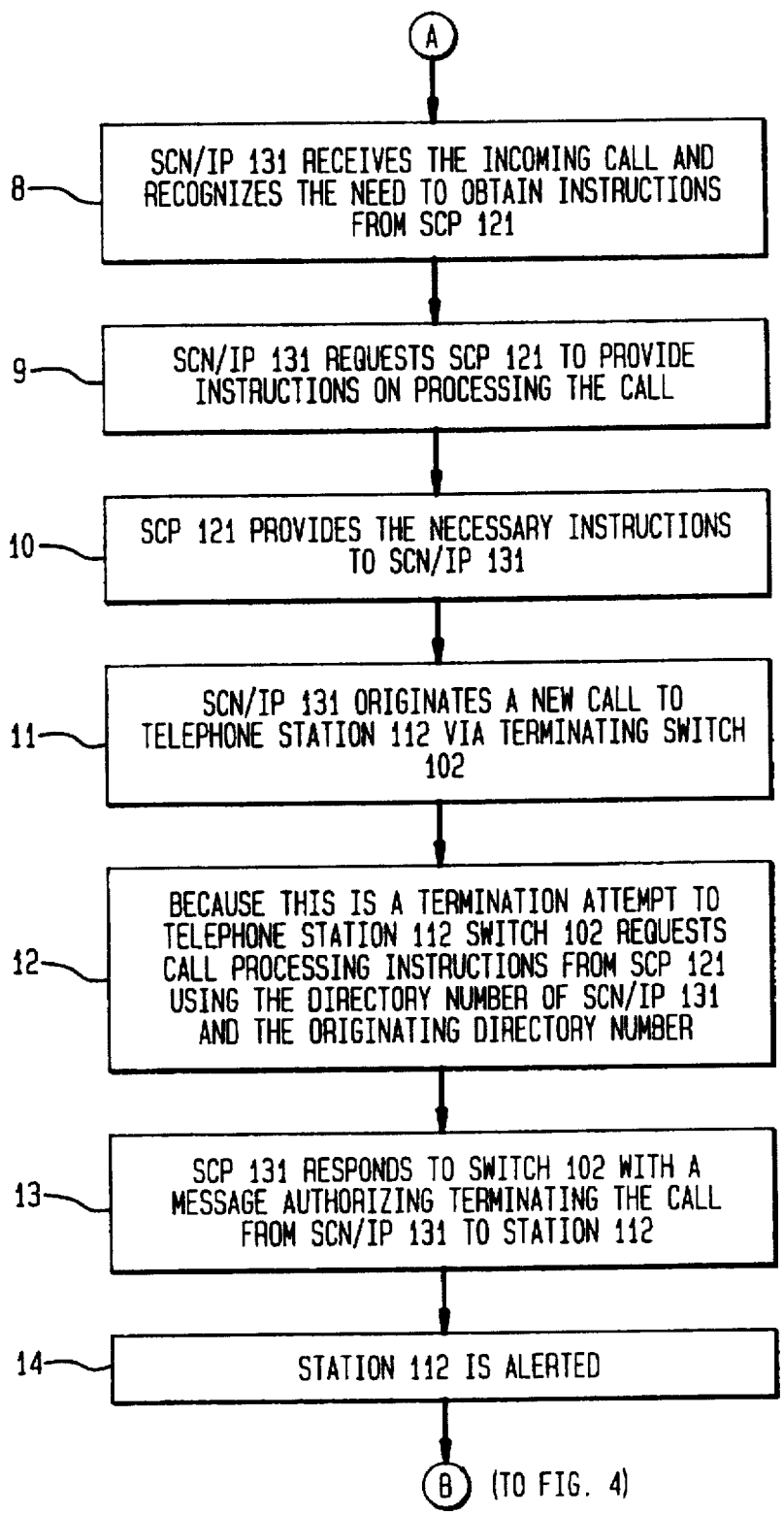
Figure 4:
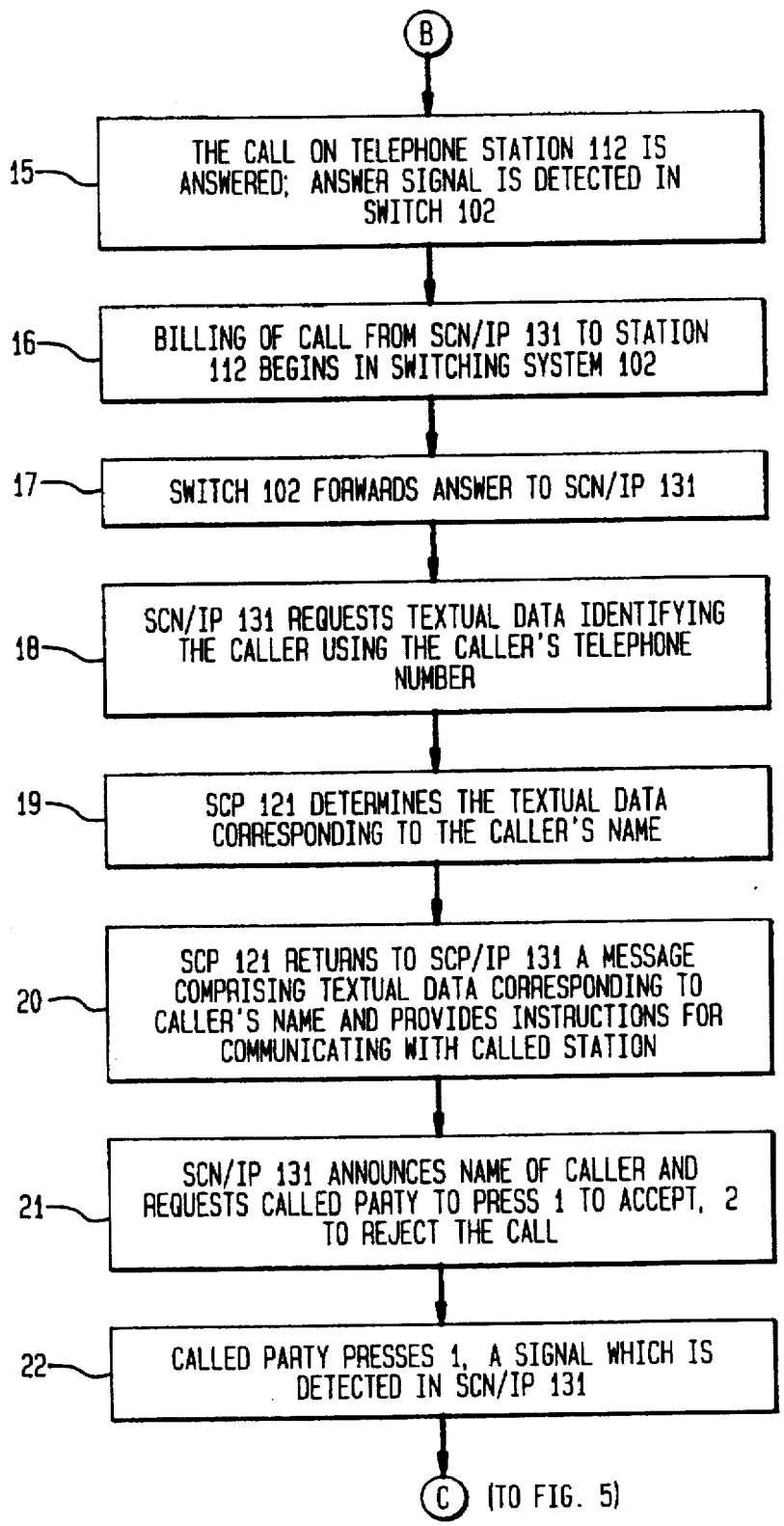
Figure 5:
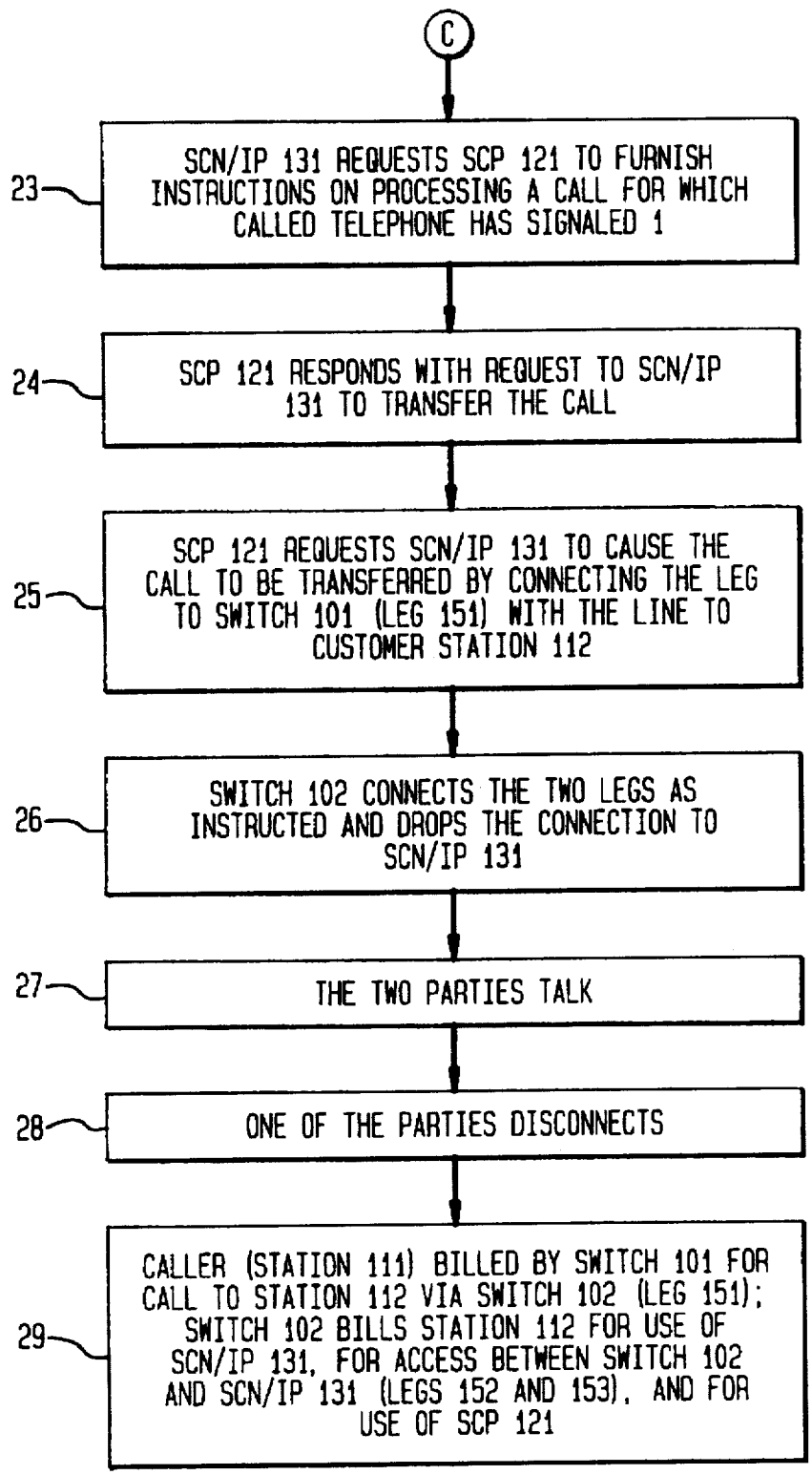

FIG. 1 is a block diagram showing the main components of the arrangement for providing calling party identification announcement service (CPIAS). A telephone call is to be established between telephone stations 111 (the calling station) and 112 (the called station). Calling station 111 is connected to originating switching system (switch) 101 and called station 111 is connected to terminating switching system (switch) 102. Terminating switch 102 is connected to SCN/IP 131 for providing the announcement. The overall system also includes a data base, called a switching control point (SCP) 121, which can be accessed via a Signaling System 7 (SS7) signaling network 141 connected to switch 102, SCN/IP 131 and SCP 121. CPIAS is provided under the control of the data base in accordance with the well known principles of intelligent networks. It is expected that the highly flexible service provided by intelligent network control of CPIAS will be a requirement. Switch 101 need not be connected to network 141 provided it has signaling arrangements permitting it to forward the calling number to switch 102. When a call is received from calling station 111 by switch 101, switch 101 initiates establishment of a connection, possibly via other switches, to switch 102 and passes to switch 102 the directory number of calling station 111. Identification of the directory number of the calling party is generally obtained using the well-known technique of automatic number identification which obtains the caller's billing number; for those cases in which the billing number is not the same as the directory number, the originating switch derives the directory number of the calling line through a translation and forwards this to the terminating switch. The calling directory number is forwarded to switch 102 either over the link which will carry the call or by a common channel signaling (CCS) message via SS7 network 141 from switch 101 to switch 102.

In this description, the terms "establish a connection to a party" and "establish a connection to a telephone station" are used interchangeably. A switch establishes a connection to, and exchanges signals with, a telephone station. The party then uses the station to communicate, via another station, with another party.

Upon receipt of the call, including the caller's telephone number, switch 102 makes a translation of the called directory number, which translation is augmented by data from SCP 121 as described hereinafter, and makes a determination that the call should be forwarded to SCN/IP 131. Switch 102 then connects the call to SCN/IP 131 and forwards the calling directory number. SCN/IP 131 queries SCP 121 for instructions on processing the call. SCN/IP 131, in response to the instructions, originates an outgoing call via switch 102 to the terminating telephone station 112.

Upon receiving this second incoming call for terminating station 112, switch 102 again makes an inquiry on how to process the call. This time, because the SCP recognizes that the call is from an SCN/IP, the SCP requests that the second call be allowed to terminate. When the called station answers, the answer signal is forwarded to the SCN/IP, which again asks for instructions from the SCP. The SCP responds with a textual version of the name of the caller (i.e., the name assigned to the calling telephone number); an identification of an instruction announcement ("You have received a call from [synthesized announcement of caller's name]; if you wish to accept, press 1, or if you wish to decline the call, press 2"); and instructions to play the announcement and the synthesized name to the called party. The SCN/IP synthesizes the announcement of the name and plays this announcement and the instruction announcement. After the called station has signaled an agreement to accept the call, the SCN/IP requests switch 102 to make a direct connection between telephone station 112 and the call connection between originating switch 101 and terminating switch 102 so that telephone stations 111 and 112 can communicate.

In accordance with one preferred embodiment of applicants' invention, the connection between the terminating switch and the service node is an Integrated Services Digital Network (ISDN) connection, wherein the two legs (152 and 153) that are connected to the service node are on different call appearances of one B-channel. This simplifies the process of dropping the connection to the service node and bridging the incoming call connection to the terminating party; this is accomplished by sending a transfer request command to the terminating switch requesting that the two call appearances be merged and that the B-channel be disconnected.

Switch 102 and SCN/IP 131 are both operative under program control. Switch 102 includes processor means 103 for controlling the operation of the switch and for generating and receiving messages from SS7 network 141. Similarly, SCN/IP 131 includes processor means 132, for controlling the operation of the SCN/IP and for generating and receiving messages from SS7 network 142. Processor means 103 and 132 each include a CPU (central processing unit) (105 and 134, respectively) controlling the generating and receiving of signals and messages and for controlling the operation of the unit, the CPUs being under the control of programs 104 and 134, respectively. Switch 102 and SCN/IP are connected by an ISDN connection.

The terminating switch does not know the type of service to be provided by the SCN/IP. In the case of CPIAS, the switch also does not know whether the announcement was actually provided to the called station. More generally, for any service provided by the SCN/IP, the switch does not know what SCN/IP resources were used. Therefore, the source of the information for making a billing entry for the called party is the SCN/IP and SCP not the terminating switch. The SCP supplies the information for the billing entry for the called party for the forwarded legs of the call (152, 153), and the SCN/IP supplies the confirmation that the forwarded leg was actually completed, in this case, that the synthesized announcement was actually delivered to the called party.

A more detailed description of the steps required to provide the calling number announcement service is provided in FIGS. 2-5. In the example of these Figures, a calling party (station 111) connected to switch 101 and having a telephone number 708-968-1000 dials the number 708-979-2000 which is the number of a called party (station 112) connected to switch 102. The various steps are numbered for easy reference.

In step 1 the caller dials the number 708-979-2000 into switch 101, switch 101 routes the call to switch 102, and prepares a billing record so that the originating telephone (whose number is 708-968-1000) will be billed for leg 151 of the call. (Leg 151 is that portion of the connection which connects the caller to the terminating switch 102.) The billing will be from the time that the caller receives an answer signal. In step 2, the call is routed to switch 102.

In step 3 the terminating switch 102 receives the called telephone number and makes a translation number. In doing so, the terminating office finds that the party having number 708-979-2000 is provided with a service that requires a query for details from SCP 121 if it finds the called station on-hook of (of CPIAS on call waiting) if the called party is busy on a call. Switch 102 recognizes the need for a query to the SCP to determine treatment of the call. In step 4, the query is transmitted to SCP 121.

In step 5 the response message from the SCP to switch 102 request the switch to forward the call to the SCN/IP. In step 6, switch 102 starts the billing of the leg of the call used for accessing the SCP/IP (leg 152) with the intent to charge the called customer for this leg of the call if the called customer answers. Details of the billing are provided in the response from the SCP.

In step 7, the call is routed to the SCN/IP, which receives from switch 102 the telephone number of the called party and the telephone number of the calling party.

In step 8, SCN/IP receives the call and recognizes the need to query the SCP to provide instructions and the text version of the calling party's name. In step 9, the SCN/IP queries SCP 121 to provide instructions for processing the call. In step 10, the SCP provides instructions to the SCN/IP to establish a new related call to the terminating telephone station 112.

In this description, each query and each response is represented by one step. If the SCN/IP is relatively simple, multiple queries may be required at certain steps (for instance, steps 18 and 20) because the length of an appropriate message may be too long or because the SCN/IP may require step by step instructions.

In step 11, a new call from SCN/IP to switch 102, over leg 153, is originated, the call being directed to the terminating telephone (the telephone station whose number is 708-979-2000). In step 12, receipt of this call triggers the same type of query as is generated in step 4, except that the identity of the SCN/IP, the new originator, is also transmitted in this query. Switch 102 sends a message to the SCP indicating that there is a termination attempt from the SCN/IP to switch 102. The SCP determines instructions based on the called directory number and the calling directory number and a directory number assigned to the SCN/IP. (The SCN/IP is accessed from switch 102 by use of a directory number which is the directory number of a trunk group or is a route index (an index for obtaining the identity of one or more trunk groups of a route) connecting the terminating switch and the SCN/IP so that any available trunk between switch 102 and SCN/IP may be used for this connection. The availability of a directory number or route index allows the connection to be established in a conventional way.)

The SCP can distinguish this incoming call from the original incoming call because it can identify an SCN/IP as the originator. Therefore in step 13 the SCP responds by authorizing termination of the call from SCN/IP to the called party.

In step 14, the called party is alerted (generally with a ringing signal or in the case of a call waiting situation, is provided with the call walling signal) and in step 15 the called party answers (or in the case of call waiting situation provides the signal indicating the desire to hear the name of the caller of the waiting call). In step 16, billing for the call from SCN/IP to the called party (leg 152, leg 153 and the use of the SCN/IP and the SCP) begins in the terminating switch. In step 17 the answer signal is forwarded to the SCN/IP.

In step 18, the SCN/IP requests from the SCP the textual data identifying the caller, using the caller's telephone number (directory number), and also requests data for instructing the called party. In step 19, SCP 121 determines the textual data and data for identifying an announcement (e.g., "press 1 to accept, 2 to decline the call") to the called party. In step 20, SCP 121 returns a message to the SCN/IP, containing the textual data and the identification of the instruction announcement. In step 21, the SCN/IP synthesizes an announcement of the name, and plays an announcement of the instructions and the name.

In step 22 the called party presses 1 to indicate a willingness to accept the call. In step 23, the SCN/IP again communicates with the SCP in order to receive further instructions on how to treat the call. The instructions, i.e., to request a transfer of the call, are furnished by the SCP in step 24. In step 25, the SCN/IP sends a signal to switch 102 to directly connect leg 151 of the call to the called party's line for connection to the called station and disconnects the two legs 152 and 153 between the SCN/IP and switch 102. This allows the two parties to talk (step 27), and allows switch 101 to start billing for the call. When either subscriber disconnects (step 28) the final billing entry for the caller for the use of leg 151 is prepared (step 29) by switch 101 and for the use of SCN/IP and SCP, and, perhaps legs 152 and 153, is prepared by switch 102.

In accordance with an alternative embodiment of applicant's invention, the SCN/IP can be provided with greater autonomy and make fewer requests for direction from the SCP. In this alternate scenario, the SCN/IP does not require additional information from the SCP after step 10, because it has received and stored all the required information about the caller, called party and service. Thus, all the subsequent steps of querying the SCP by the SCN/IP are eliminated: these include steps 18-20 and 23-24. The equivalent of the queries is simply an access of memory in the SCN/IP to obtain the information previously stored.

In alternative arrangements, the SCN/IP and SCP can be interconnected via protocols and data network arrangements other than the SS7 of applicant's preferred embodiment.

FIGS. 2-5 illustrate the method for an incoming call. The method for a waiting call is essentially the same, except that: switch 102 responds to the waiting call even though the called party is busy on another call; the called party responds to a call waiting signal instead of a ringing signal; if the called party decides to accept the waiting call, the waiting call is connected and the original call is placed on hold, and thereafter, the called party can switch between the original call and the waiting call by flashing the switch hook.

While in the example of this preferred embodiment, a single data base (SCP) is used, in other applications it may be desirable to use different data bases for different functions; for example, it may be desirable to use a different data base for obtaining the text version of the calling party's name.

Other arrangements will be apparent to those of ordinary skill in the art. This invention is therefore only limited by the claims attached hereto.

We claim:

1. A method of providing CPIAS (calling party identification announcement service), comprising the steps of:

responsive to receipt of an incoming or intra-office call to a called number, determining whether the called number has CPIAS;

responsive to a determination that the called number has CPIAS, establishing a connection between a terminating switch of said call and a service circuit node/intelligent peripheral (SCN/IP);

querying a data base to determine a textual version of a name assigned to a calling number of said call;

providing said textual version to said SCN/IP;

establishing a connection from said SCN/IP to a called station of said called number;

said SCN/IP converting said textual version to an announcement comprising said name and playing said announcement to said called station;

billing said calling number for said incoming or intra-office call in the switch connected to said calling number; and billing said called number, for the use of the SCN/IP in said terminating switch.

2. The method of claim 1 wherein the determining step comprises:

determining in said terminating switch that a query to a data base is required in order to process said call;

responsive to determining that said query to said data base in required, sending a query message to said data base; and said data base responding with a response message indicating that said call is to be forwarded to said SCN/IP.

3. The method of claim 2 further comprising the steps of:

receiving a call accept signal from said called station, in said SCN/IP over said connection between said called station and said SCN/IP; and responsive to receipt of said call accept signal, sending an indication to said terminating switch requesting that a connection be established extending said incoming or intra-office call to said called station.

4. The method of claim 3 further comprising the steps of:

responsive to receipt of said accept signal, sending another query to said data base; and responsive to receipt of an answer to said another query, sending said indication to said terminating switch requesting that said connection be established extending said call to said called station.

5. The method of claim 1 wherein said SCN/IP is assigned a directory number or route index, wherein the step of establishing a connection from said SCN/IP to said called station comprises the steps of:

responsive to receipt of a request from said SCN/IP to establish said connection to said called station, querying a data base with a request message for instructions on how to respond to said request, the request message comprising the called station's telephone number and the directory number or route index of said SCN/IP;

said data base, differentiating the request from the SCN/IP from an original request for said call because of the characteristics of the directory number or route index of the SCN/IP, responding to said request message with a command to said SCN/IP to establish said connection between said SCN/IP and said called station.

6. Apparatus for providing CPIAS (calling party identification announcement service) comprising:

a terminating switch; and a SCN/IP (service circuit node/intelligent peripheral);

said terminating switch, operative under program control, responsive to receipt of a call, for controlling determination of whether a called station having a called directory number of said call has CPIAS, and, responsive to a determination that said called station has CPIAS, routing said call to said SCN/IP;

said SCN/IP, operative under program control, for querying a data base to determine a textual version of a name assigned to a calling number of said call, for establishing a connection to said terminating switch, and for requesting said terminating switch to establish a connection between that connection from the SCN/IP and said called station;

said terminating switch establishing a connection between said SCN/IP and said called station in response to the request from the SCN/IP;

said SCN/IP responsive to an answer signal from said called station to synthesize and play an announcement of said name, and responsive to receipt of an accept signal, to request said terminating switch to extend said call from said terminating switch to said called station.

* * * * *